United States Patent
Hori et al.

(10) Patent No.: US 9,393,571 B2
(45) Date of Patent: Jul. 19, 2016

(54) COOLANT SYSTEM (71) Applicants: Nobumitsu Hori, Ichinomiya (JP); Tetsuaki Wada, Kariya (JP); Tetsuya Matsumoto, Kasugai (JP); Hiroto Kamei, Kariya (JP); Shigeyuki Kato, Kariya (JP)

(72) Inventors: Nobumitsu Hori, Ichinomiya (JP); Tetsuaki Wada, Kariya (JP); Tetsuya Matsumoto, Kasugai (JP); Hiroto Kamei, Kariya (JP); Shigeyuki Kato, Kariya (JP)

(73) Assignees: JTEKT Corporation, Osaka-shi (JP); CNK CO., LTD., Kariya-shi (JP)

( * ) Notice: Subject to any disclaimer, the term of this patent is extended or adjusted under 35 U.S.C. 154(b) by 128 days.

(21) Appl. No.: 14/065,887

(22) Filed: Oct. 29, 2013

(65) Prior Publication Data

US 2014/0116930 A1 May 1, 2014

(30) Foreign Application Priority Data

Oct. 30, 2012 (JP) .................................. 2012-238510

(51) Int. Cl.
- *B01D 35/02* (2006.01)
- *B03C 1/30* (2006.01)
- *B23Q 11/10* (2006.01)

(52) U.S. Cl.
CPC .............. *B03C 1/30* (2013.01); *B23Q 11/1069* (2013.01); *B03C 2201/18* (2013.01)

(58) Field of Classification Search
None
See application file for complete search history.

(56) References Cited

U.S. PATENT DOCUMENTS

2014/0116930 A1*  5/2014  Hori et al. ................. 210/167.01

FOREIGN PATENT DOCUMENTS

| EP | 2 065 127 A1 | 6/2009 |
|---|---|---|
| JP | H6-210198 A | 8/1994 |
| JP | 2003-175437 | 6/2003 |
| JP | 2005-319566 A | 11/2005 |
| JP | 2006-55981 | 3/2006 |
| JP | 2012-45678 | 3/2012 |
| JP | 2012-125909 | 7/2012 |
| WO | WO 2008/035551 A1 | 3/2008 |

OTHER PUBLICATIONS

Extended European Search Report issued Jan. 16, 2014 in Patent Application No. 13190190.2.
Japanese Decision of Grant of a Patent issued Apr. 5, 2016 in Japanese Patent Application No. 2012-238510.

* cited by examiner

*Primary Examiner* — Robert Popovics
(74) *Attorney, Agent, or Firm* — Oblon, McClelland, Maier & Neustadt, L.L.P.

(57) ABSTRACT

In a coolant system, the interior of a reservoir frame storing the coolant discharged from a machine tool is partitioned by a partition member into an outer peripheral coolant tub and a central coolant tub. The partition member is formed with a silt that extends in the depth direction to make the outer peripheral coolant tub communicate with the central coolant tub. A suction port of a pump that feeds the coolant in the central coolant tub to a filtering device is arranged in the central coolant tub. The coolant discharged from the machine tool is supplied to the central coolant tub without passing through the outer peripheral coolant tub. At least a part of the coolant filtered by the filtering device is supplied to the outer peripheral coolant tub without passing through the central coolant tub.

8 Claims, 4 Drawing Sheets

COOLANT SYSTEM

INCORPORATION BY REFERENCE

This application is based on and claims priority under 35 U.S.C. 119 with respect to Japanese Application No. 2012-238510 filed on Oct. 30, 2012, the entire content of which is incorporated herein by reference.

BACKGROUND OF THE INVENTION

1. Field of the Invention

The present invention relates to a coolant system that filters and circulates coolant used in a machine tool.

2. Discussion of the Related Art

Various coolant systems are described in JP2006-055981A, JP2003-175437A, WO2008/035551A, JP2012-045678A, and JP2012-125909A.

In a coolant system, coolant is discharged from a machine tool to a reservoir and is fed by a pump from the reservoir to a filtering device. In the reservoir, the coolant around a suction port of the pump is drawn by the pump and is fed to the filtering device. On the other hand, the coolant being far from the pump in the reservoir is hard to be drawn by the pump. However, in the aforementioned coolant systems, it is not easy to draw into the pump the floating matter in the coolant that is far from the pump in the reservoir.

SUMMARY OF THE INVENTION

The present invention has been made taking the circumstance like this into consideration, and an object thereof is to provide a coolant system capable of reliably drawing floating matter in coolant that is far from a pump, into the pump.

According to the present invention in a first aspect, there is provided a coolant system which comprises a reservoir that stores coolant discharged from a machine tool; a filtering device that filters the coolant in the reservoir; a first pump that feeds the coolant after filtration to the machine tool; and a second pump that feeds the coolant in the reservoir to the filtering device. The reservoir comprises a reservoir frame; and a partition member that partitions the interior of the reservoir frame into an outer peripheral coolant tub and a central coolant tub and that is formed with a slit extending in the depth direction to make the outer peripheral coolant tub communicate with the central coolant tub. A suction port of the second pump is arranged in the central coolant tub. The system further comprises a first supply port that supplies the central coolant tub with the coolant fed from the machine tool without passing through the outer peripheral coolant tub; and a second supply port that supplies the outer peripheral coolant tub with at least a part of the coolant filtered by the filtering device and fed from the filtering device without passing through the central coolant tub.

With this construction, the interior of the reservoir is partitioned by the partition member into the outer peripheral coolant tub and the central coolant tub. The suction port of the second pump that feeds the coolant from the reservoir to the filtering device is arranged in the central coolant tub in the interior of the reservoir. Then, the coolant discharged from the machine tool is supplied to the central coolant tub without passing through the outer peripheral coolant tub. That is, the dirty coolant discharged from the machine tool is supplied to the central coolant tub arranging the suction port of the second pump therein. Accordingly, it is possible to reliably feed the dirty coolant to the filtering device by the second pump.

It may be the case that dirty floating matter is contained in the coolant having been filtered by the filtering device. The floating matter can reliably be removed by making the coolant containing the floating matter pass through the filtering device. To this end, according to the coolant system in the present invention, the coolant having been filtered by the filtering device is supplied to the outer peripheral coolant tub. Since the partition member is formed with the slit, it is possible for the coolant supplied to the outer peripheral coolant tub to move from the outer peripheral coolant tub to the central coolant tub through the slit.

Further, the slit is formed to extend in the depth direction. Therefore, the coolant in the outer peripheral coolant tub is led to the central coolant tub through a wide area in the depth direction of the outer peripheral coolant tub. As a result, as the coolant containing floating matter in the outer peripheral coolant tub is led to the central coolant tub and is fed by the second pump from the central coolant tub to the filtering device, whereby the floating matter is removed.

BRIEF DESCRIPTION OF THE ACCOMPANYING DRAWINGS

The foregoing and other objects and many of the attendant advantages of the present invention may readily be appreciated as the same becomes better understood by reference to the preferred embodiment of the present invention when considered in connection with the accompanying drawings, wherein like reference numerals designate the same or corresponding parts throughout several views, and in which.

DETAILED DESCRIPTION OF THE PREFERRED EMBODIMENT (Construction of Coolant System)

Figure 1:
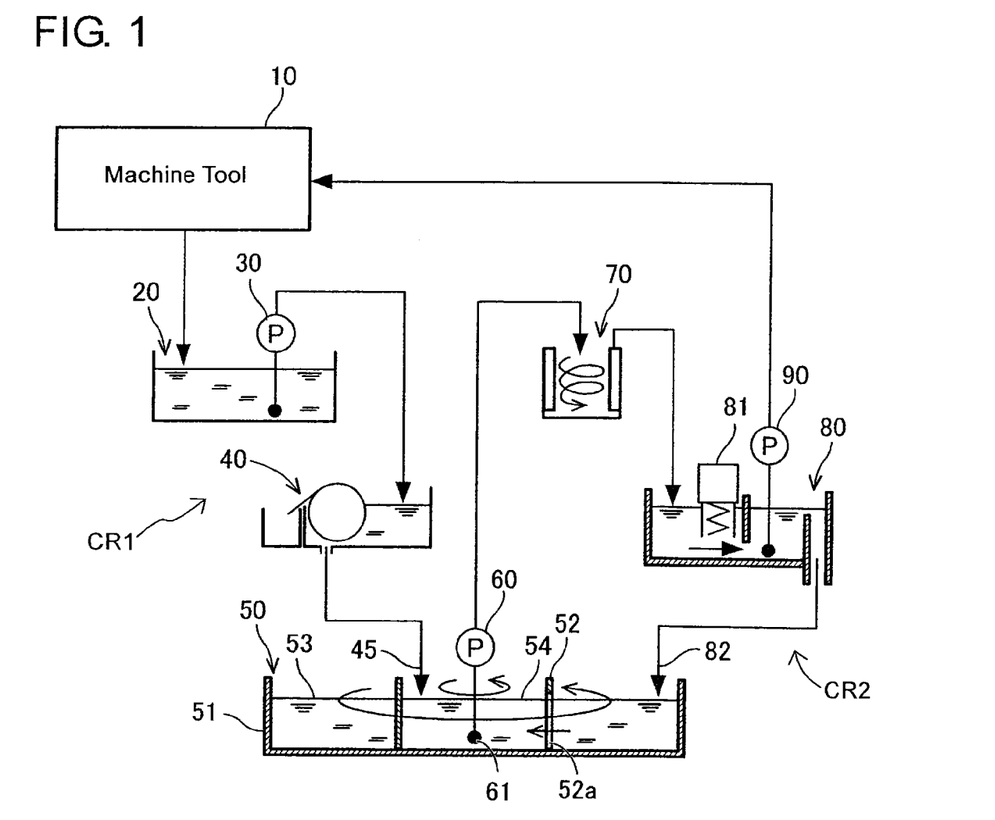
FIG. 1 is a system block diagram of a coolant system in an embodiment according to the present invention.

The system construction of a coolant system in the present embodiment will be described with reference to FIGS. 1 and 2. As shown in FIG. 1, the coolant system is a system for purifying dirty coolant having been used in a machine tool 10. In the coolant system, the dirty coolant is purified by being subjected to filtration at two stages, and the purified coolant is returned to the machine tool 10.

The coolant system is provided with a collecting reservoir 20, a pump 30, a primary filtering device 40, a primary reservoir 50, a pump 60, a secondary filtering device 70, a secondary reservoir 80, and a circulation pump 90. The collecting reservoir 20 collects the coolant discharged form the machine tool 10, that is, the coolant having been used for the machining in the machine tool 10. The coolant contains machining (cutting/grinding) chips, abrasive grains and the like.

A suction port of the pump 30 is arranged in the collecting reservoir 20, and a discharge port of the pump 30 is arranged in the primary filtering device 40. Specifically, by the driving of the pump 30, the dirty coolant stored in the collecting reservoir 20 is fed to the primary filtering device 40. A magnet separator is used as the primary filtering device 40. However, other filtering devices than the magnet separator can be used as the primary filtering device 40. The primary filtering device 40 in the present embodiment mainly removes machining chips of metal contained in the coolant.

The coolant from which the machining chips of metal have been removed by the primary filtering device 40 is discharged to the primary reservoir 50 (corresponding to the "reservoir" in the claimed invention). That is, the primary reservoir 50 stores the coolant having the machining chips of metal removed. As shown in FIGS. 1 and 2, the primary reservoir 50 is provided with a reservoir frame 51 and a partition member 52. The reservoir frame 51 forms an outer frame container. Here, the reservoir frame 51 takes a bottomed cylindrical shape.

The partition member 52 is secured to the reservoir frame 51 so as to partition the interior of the reservoir frame 51 into an outer peripheral coolant tub 53 and a central coolant tub 54. The partition member 52 takes a cylindrical shape. That is, the outer peripheral coolant tub 53 is formed between the inner peripheral surface of the reservoir frame 51 and the outer peripheral surface of the partition member 52 in the radial direction. In other words, the outer peripheral coolant tub 53 is formed to a doughnut shape. The central coolant tub 54 is formed at a radially inside portion of the internal surface of the partition member 52. Although formed to have a circular periphery, each of the outer peripheral coolant tub 53 and the central coolant tub 54 may take a curved peripheral shape without being limited to the circular periphery.

The partition member 52 does not take the shape that is partitioned entirely over the whole circumference. The partition member 52 is formed with a slit 52a that makes the outer peripheral coolant tub 53 communicate with the central coolant tub 54. The slit 52a is formed to extend in the depth direction. Specifically, the bottom surface of the slit 52a is located on the bottom surface of the reservoir frame 51, and the upper surface of the slit 52a is located above the surface of the coolant stored in the primary reservoir 50.

Then, a supply port 45 for supplying coolant from the primary filtering device 40 to the primary reservoir 50 is arranged to be oriented toward the central coolant tub 54. That is, the coolant filtered by the primary filtering device 40 is supplied to the central coolant tub 54 without passing through the outer peripheral coolant tub 53. In other words, the supply port 45 (corresponding to the "first supply port" in the claimed invention) supplies the central coolant tub 54 with the coolant that is fed from the machine tool 10 without passing through the outer peripheral coolant tub 53. Further, the supply port 45 opens close to the radially outer side in the interior of the central coolant tub 54 and is oriented in parallel to the tangential direction to a part close thereto of the partition member 52. Thus, a rotational flow (counterclockwise in FIG. 2) is generated in the central coolant tub 54 by the coolant supplied from the supply port 45 to the central coolant tub 54.

Further, a guide member 56 is provided on the internal surface of the partition member 52 to extend from one end in the circumferential direction of the slit 52a toward the radially inner side. The guide member 56 is not oriented toward the center and is rather slanted toward the slit 52a side. Thus, the guide member 56 guides the coolant flow in the central coolant tub 54 radially inward on the upper stream side than the slit 52a of the rotational flow in the central coolant tub 54.

A suction port 61 of the pump 60 is arranged at the center in the central coolant tub 54, and a discharge port of the pump 60 is arranged in the secondary filtering device 70. That is, by the driving of the pump 60, the coolant stored in the central coolant tub 54 is fed to the secondary filtering device 70. Particularly, the suction port 61 of the pump 60 is arranged at a position close to the bottom surface at the center of the central coolant tub 54. That is, the suction port 61 of the pump 60 is arranged at the center of the rotational flow of the coolant.

The unit flow rate (flow quantity per unit time) of the coolant supplied from the supply port 45 to the central coolant tub 54 is set to be less than the unit flow rate of the coolant drawn from the suction port 61 of the pump 60. That is, in the present embodiment, the unit suction flow rate of the pump 30 is set to be less than the unit suction flow rate of the pump 60.

The secondary filtering device 70 uses a cyclone filtering device and removes machining chips (cutting/grinding chips) and sludge that have not been removed by the primary filtering device 40. The coolant filtered by the secondary filtering device 70 becomes coolant having been purified sufficiently. The coolant filtered by the secondary filtering device 70 is discharged to the secondary reservoir 80. That is, the secondary reservoir 80 stores the sufficiently purified coolant. The secondary reservoir 80 is provided with a thermoregulator 81, and the coolant in the secondary reservoir 80 is cooled by the thermoregulator 81 to become a constant temperature.

A suction port of the circulation pump 90 is arranged in the secondary reservoir 80, and a discharge port of the circulation pump 90 is connected to a coolant supply device (not shown) on the machine tool 10 side. That is, by the driving of the circulation pump 90, the coolant stored in the secondary reservoir 80 is fed to the machine tool 10.

The unit flow rate of the coolant drawn by the circulation pump 90 is set to be less than the unit flow rate of the coolant drawn by the pump 60. Accordingly, there can arise a state that the stored quantity in the secondary reservoir 80 exceeds a prescribed quantity. The coolant exceeding the prescribed quantity in the secondary reservoir 80 is returned from the secondary reservoir 80 to the primary reservoir 50. A returning supply port 82 from the secondary reservoir 80 to the primary reservoir 50 is arranged to be oriented toward the outer peripheral coolant tub 53 of the primary reservoir 50. That is, the coolant that is to overflow from the secondary reservoir 80 is supplied to the outer peripheral coolant tub 53 without passing through the central coolant tub 54. In other words, the returning supply port 82 (corresponding to the "second supply port" in the claimed invention) supplies the outer peripheral coolant tub 53 with at least a part of the coolant that is filtered by the filtering device 70 and that is led from the filtering device 70 without passing through the central coolant tub 54.

Further, the returning supply port 82 opens close to the radially outer side in the interior of the outer peripheral coolant tub 53 and is oriented in parallel to the tangential direction to an outer peripheral portion close thereto of the reservoir frame 51. That is, a rotational flow (counterclockwise in FIG. 2) is generated in the outer peripheral coolant tub 53 by the coolant supplied from the returning supply port 82 to the outer peripheral coolant tub 53. The rotational flow in the outer peripheral coolant tub 53 and the rotational flow in the central coolant tub 54 are made to be the same in rotational direction.

(Operation of Coolant System)

The operation of the aforementioned coolant system will be described with reference to FIGS. 1 and 2. Description will be made separately in two different cases that the machine tool 10 is in operation and that the machine tool 10 is out of operation.

First of all, in the case that the machine tool 10 is in operation, the circulation pump 90 and the pumps 30, 60 are driven. The coolant after use in the machine tool 10 is discharged to the collecting reservoir 20 and is fed by the driving of the pump 30 to the primary filtering device 40. The coolant after filtration by the primary filtering device 40 is discharged to the central coolant tub 54 of the primary reservoir 50.

The coolant in the central coolant tub 54 rotates in the central coolant tub 54 to move the floating matter in the coolant toward the rotational center side. The suction port 61 of the pump 60 is arranged at the rotational center. Thus, the floating matter in the coolant is drawn into the pump 60 together with the coolant rotating in the central coolant tub 54. The drawn coolant is fed to the secondary filtering device 70 and, after being filtered, is discharged to the secondary reservoir 80.

Particularly, the interior of the primary reservoir 50 is partitioned by the partition member 52 into the outer peripheral coolant tub 53 and the central coolant tub 54, and the dirty coolant discharged from the primary filtering device 40 is supplied to the central coolant tub 54 that is adjacent to the suction port 61 of the pump 60. Accordingly, it is possible to reliably feed the dirty coolant to the secondary filtering device 70 by the pump 60.

Further, the unit flow rate of the coolant supplied from the primary filtering device 40 to the central coolant tub 54 of the primary reservoir 50 is less than the unit flow rate of the coolant drawn by the pump 60 from the central coolant tub 54. Accordingly, the operation is done so that the storage quantity of the coolant in the central coolant tub 54 becomes less. That is, the dirty coolant supplied to the central coolant tub 54 is further reliably drawn by the pump 60.

The coolant rotating around the internal surface of the partition member 52 is brought into hit on the guide member 56 before reaching the slit 52a in the rotational direction. Then, the coolant brought into hit on the guide member 56 is guided radially inward, that is, to the suction port 61 of the pump 60. In this way, since a flow course toward the radial inside is formed just before the slit 52a, it is possible to reliably restrain the coolant in the central coolant tub 54 from moving to the outer peripheral coolant tub 53 through the slit 52a.

Then, the coolant stored in the secondary reservoir 80 after being filtered by the secondary filtering device 70 is fed by the circulation pump 90 to the machine tool 10. The unit flow rate of the coolant drawn by the circulation pump 90 is less than the unit flow rate of the coolant drawn by the pump 60. Thus, there arises a state that the coolant stored in the secondary reservoir 80 exceeds the prescribed quantity for the secondary reservoir 80. If this occurs, the coolant is to overflow from the secondary reservoir 80, and the coolant being to overflow is supplied to the outer peripheral coolant tub 53 of the primary reservoir 50.

Accordingly, based on the relation between the supply quantity into the central coolant tub 54, the drawn quantity by the pump 60 and the quantity being to overflow from the secondary reservoir 80, the flow quantity of the coolant in the primary reservoir 50 is kept at almost a constant quantity.

Based on this relation of the flow quantities, the coolant in the outer peripheral coolant tub 53 moves to the central coolant tub 54 through the slit 52a. Accordingly, the dirtiest coolant supplied from the primary filtering device 40 to the central coolant tub 54 is reliably drawn by the pump 60 without moving to the outer peripheral coolant tub 53 and is fed to the secondary filtering device 70.

Further, the coolant in the outer peripheral coolant tub 53 has been sufficiently purified by the secondary filtering device 70. However, it may be the case that the coolant also contains floating matter therein. Then, as mentioned above, the coolant in the outer peripheral coolant tub 53 moves to the central coolant tub 54, and the floating matter contained in the coolant in the outer peripheral coolant tub 53 also moves to the central coolant tub 54.

In addition to this, the coolant in the outer peripheral coolant tub 53 rotates in the outer peripheral coolant tub 53, and this causes the floating matter in the coolant to move toward the rotational center side. That is, the rotational flow causes the floating matter in the coolant to move toward the partition member 52 side in the outer peripheral coolant tub 53. The rotational flow in the outer peripheral coolant tub 53 and the rotational flow in the central coolant tub 54 are the same in rotational direction. Accordingly, the floating matter being adjacent to the slit 52a in the outer peripheral coolant tub 53 tends to move from the outer peripheral coolant tub 53 to the central coolant tub 54 through the slit 52a.

Particularly, the slit 52a is formed to extend in the depth direction. Thus, the coolant in the outer peripheral coolant tub 53 is led to the central coolant tub 54 through a wide area in the depth direction of the outer peripheral coolant tub 53. As a result, the floating matter in the coolant in the outer peripheral coolant tub 53 is led to the central coolant tub 54 and is fed by the pump 60 again to the secondary filtering device 70. That is, the coolant supplied to the outer peripheral coolant tub 53 is filtered again by the secondary filtering device 70. Consequently, a part of the coolant is purified by being caused to pass through the secondary filtering device 70 many times.

Next, in the case that the machine tool 10 is out of operation, the pump 60 only is driven, and the circulation pump 90 and the pump 30 remain stopped. In this case, coolant is neither supplied from the primary filtering device 40 to the central coolant tub 54 nor fed from the secondary reservoir 80 to the machine tool 10.

In this case, by the driving of the pump 60, coolant is fed from the central coolant tub 54 to the secondary filtering device 70 and is discharged from the secondary filtering device 70 to the secondary reservoir 80. Since the coolant in the secondary reservoir 80 is not fed to the machine tool 10, the coolant exceeds the prescribed quantity for the secondary reservoir 80 and would otherwise overflow from the same. Thus, when exceeding the prescribed quantity, the coolant in the secondary reservoir 80 is supplied to the outer peripheral coolant tub 53. Then, the coolant moves from the outer peripheral coolant tub 53 to the central coolant tub 54.

That is, the coolant circulates in the order of the outer peripheral coolant tub 53→the central coolant tub 54→the secondary filtering device 70→the secondary reservoir 80→the outer peripheral coolant tub 53. During this circulation, the coolant is continuously purified as a result of passing through the secondary filtering device 70.

In the aforementioned system construction, the collecting reservoir 20, the pump 30, the primary filtering device 40, and conduits extending from the machine tool 10 to the primary filtering device 40 through the collecting reservoir 20 and the pump 30 constitute a first coolant return mechanism CR1 that is arranged to extend from the machine tool 10 to the central coolant tub 54 for supplying the coolant discharged from the machine tool 10 to the central coolant tub 54 without making the coolant pass through the outer peripheral coolant tub 53.

In a modified form, because the coolant after use in the machine tool 10 can be supplied from the machine tool 10 directly to the central coolant tub 54, the first coolant return mechanism CR1 may be constituted by at least one conduit having the supply port (first supply port) 45 without including the collecting reservoir 20, the pump 30 and the primary filtering device 40. In another modified form, because it is possible to discharge the coolant from the machine tool 10 directly to the primary filtering device 40 which can be placed under a coolant discharge port (not shown) of the machine tool 10, the first coolant return mechanism CR1 may be constituted to merely include the primary filtering device 40 and the supply port (first supply port) 45.

Further, a conduit leading the coolant from the secondary reservoir 80 to the outer peripheral coolant tub 53 constitutes a second coolant return mechanism CR2 arranged to extend from the secondary reservoir 80 to the outer peripheral coolant tub 53 and including the returning supply port (second supply port) 82 for supplying at least a part of the coolant that is to overflow from the secondary reservoir 80, to the outer peripheral coolant tub 53.

(Construction of Coolant Unit)

Next, with reference to FIGS. 3-7, description will be made regarding one example of a device that unitizes other components than the collecting reservoir 20 and the pump 30 of the aforementioned coolant system. In FIGS. 3-7, the same components as those in FIGS. 1 and 2 will be given the same reference numerals.

Figure 3:
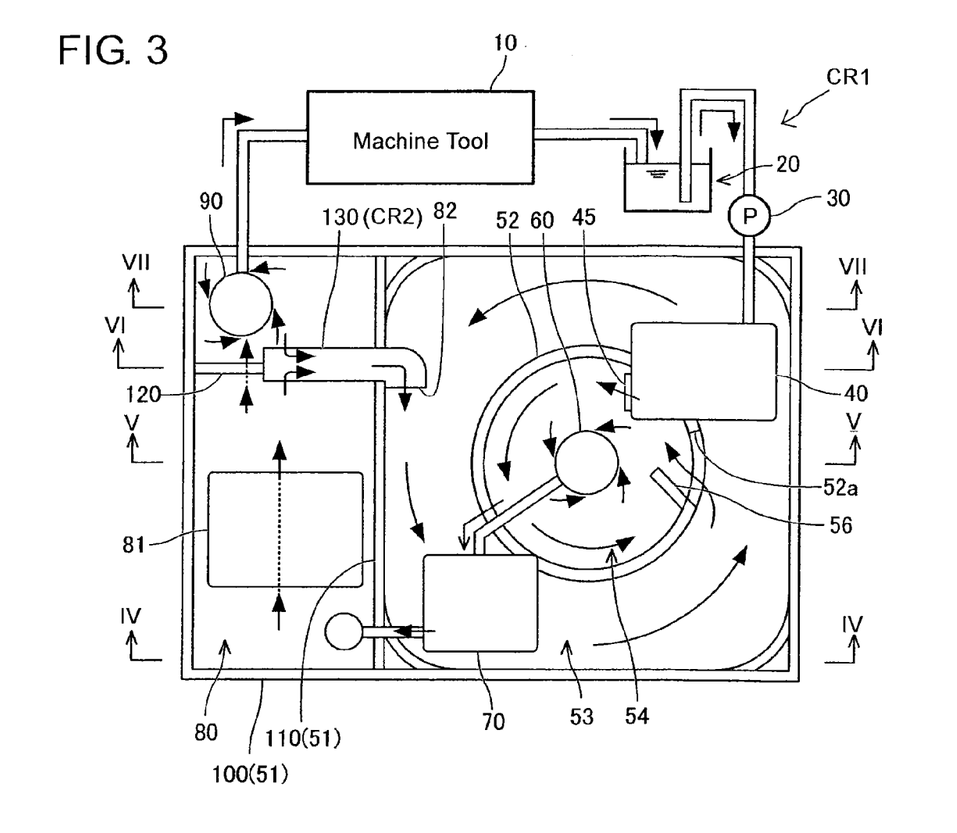
FIG. 3 is a plan view of a coolant unit to which the coolant system in FIG. 1 is applied.
Figure 4:
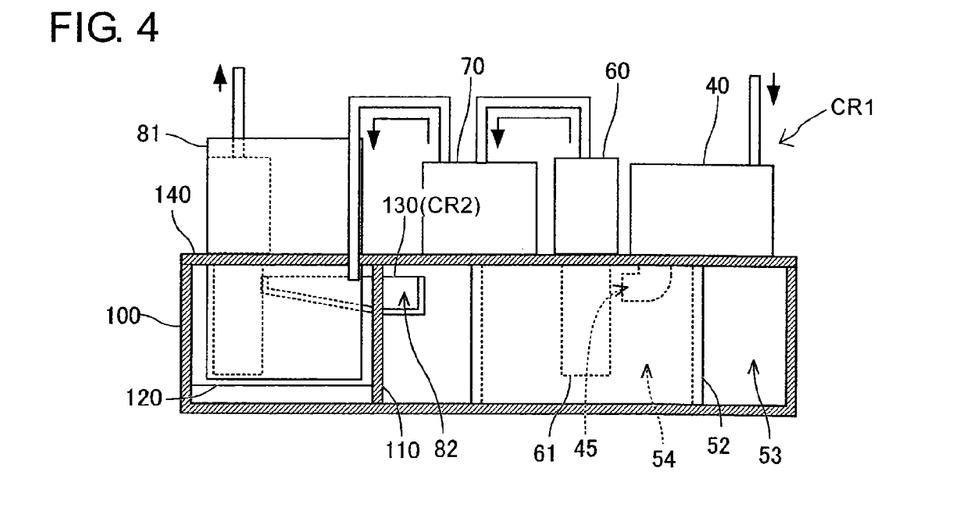
FIG. 4 is a sectional view taken along the line IV-IV in FIG. 3.
Figure 5:
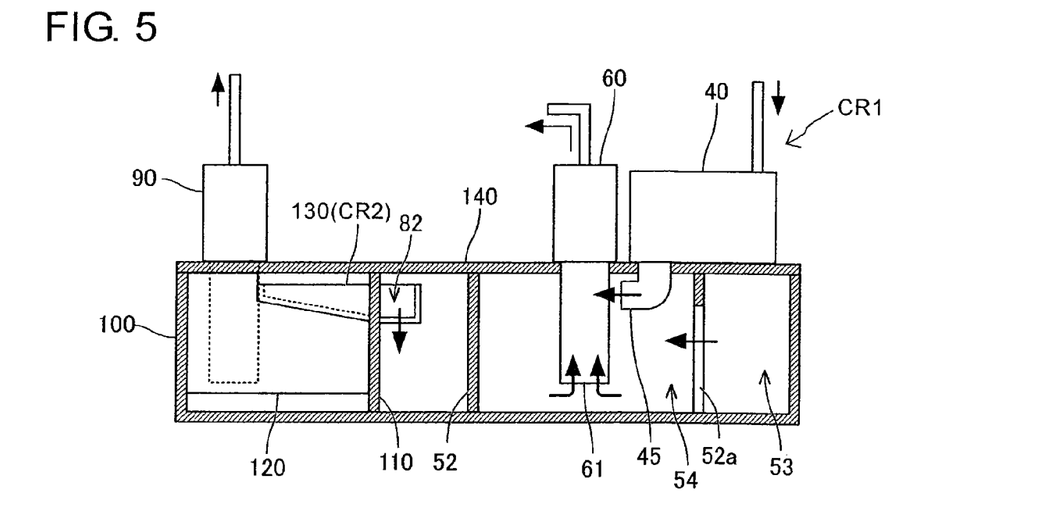
FIG. 5 is a sectional view taken along the line V-V in FIG. 3.
Figure 6:
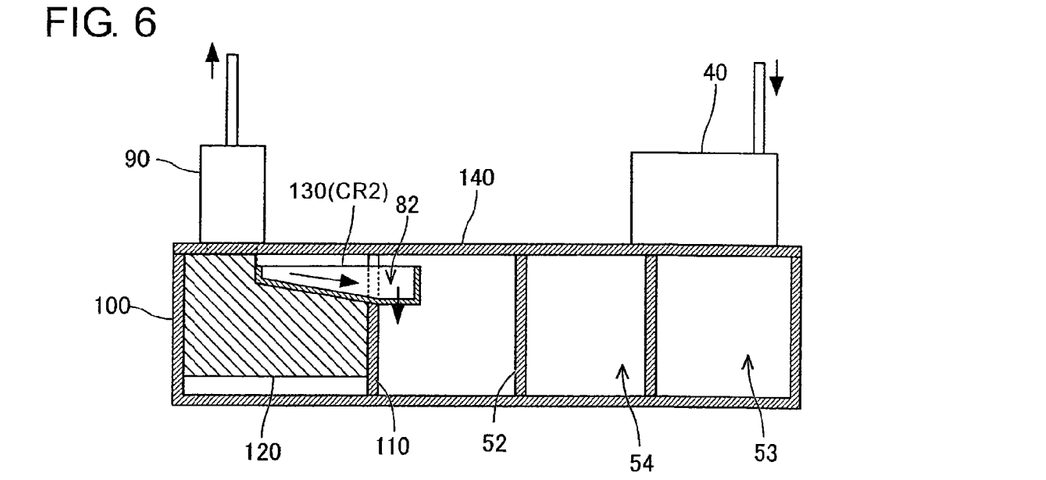
FIG. 6 is a sectional view taken along the line VI-VI in FIG. 3.
Figure 7:
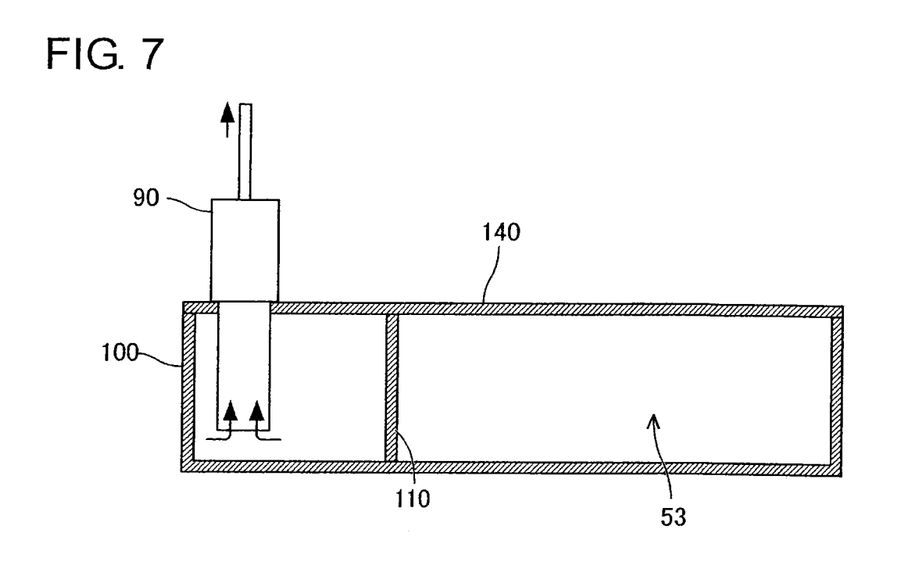
FIG. 7 is a sectional view taken along the line VII-VII in FIG. 3.

A coolant unit is provided with a unit frame (or reservoir frame) 100, a partition member 110 partitioning the interior of the unit frame 100 into the primary reservoir 50 and the secondary reservoir 80, a flow passage regulating plate 120 partly partitioning the interior of the secondary reservoir 80, a return gutter 130, and a cover member 140. The primary filtering device 40, the pump 60 and the secondary filtering device 70 shown in FIG. 1 are arranged in the part that constitutes the primary reservoir 50. Further, the thermoregulator 81 and the circulation pump 90 are arranged in the part that constitutes the secondary reservoir 80.

The return gutter 130 is a flow passage that returns the coolant that would otherwise overflows from the secondary reservoir 80, to the outer peripheral coolant tub 53 of the primary reservoir 50. The details of the components that constitute the primary reservoir 50 are almost the same as those of the construction in the aforementioned coolant system shown in FIGS. 1 and 2, and the detailed description therefor will be omitted for the sake of brevity. The reservoir frame 51 of the primary reservoir 50 in the foregoing system construction is constituted as the unit frame 100 in the coolant unit, and the unit frame 100 unites into a single body the secondary reservoir 80 and the primary reservoir 50 (corresponding to the "reservoir" in the claimed invention) whose interior is partitioned into the outer peripheral coolant tub 53 and the central coolant tub 54.

Figure 2:
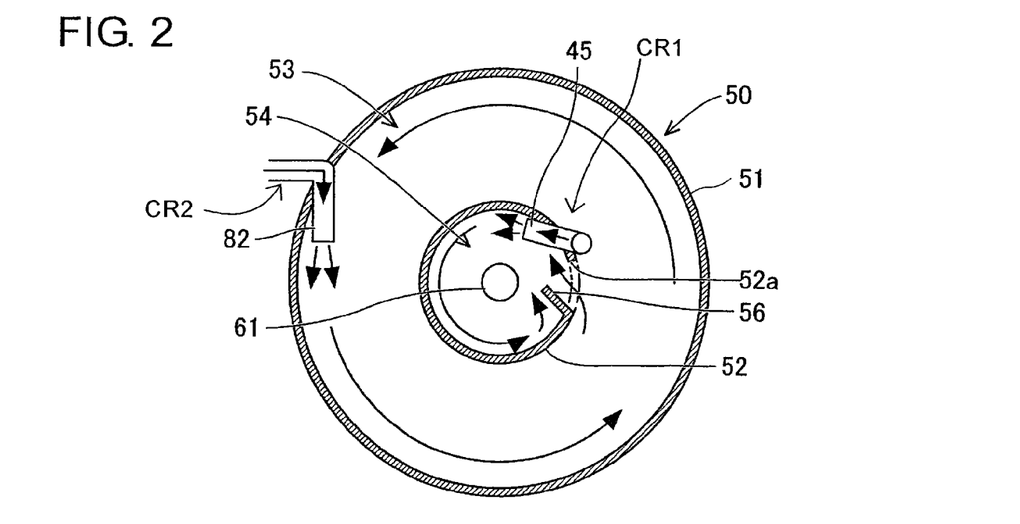
FIG. 2 is a horizontal sectional view of a primary reservoir in FIG. 1.

Various features and many of the attendant advantages in the foregoing embodiment will be summarized as follows:

According to the feature of the forgoing embodiment in the first aspect described in the summary of the invention and shown in FIGS. 1 and 2, the following advantages can be achieved. That is, the interior of the reservoir 50 is partitioned by the partition member 52 into the outer peripheral coolant tub 53 and the central coolant tub 54. The suction port 61 of the second pump 60 that feeds the coolant from the reservoir 50 to the filtering device 70 is arranged in the central coolant tub 54 in the interior of the reservoir 50. Then, the coolant discharged from the machine tool 10 is supplied to the central coolant tub 54 without passing through the outer peripheral coolant tub 53. That is, the dirty coolant discharged from the machine tool 10 is supplied to the central coolant tub 54 arranging the suction port 61 of the second pump 60 therein. Accordingly, it is possible to reliably feed the dirty coolant to the filtering device 70 by the second pump 60. Further, the coolant having been filtered by the filtering device 70 is supplied to the outer peripheral coolant tub 53. Since the partition member 52 is formed with the slit 52*a*, it is possible to move the coolant supplied to the outer peripheral coolant tub 53 from the same to the central coolant tub 54 through the slit 52*a*. In addition, the slit 52*a* is formed to extend in the depth direction. Therefore, the coolant in the outer peripheral coolant tub 53 is led to the central coolant tub 54 through a wide area in the depth direction of the outer peripheral coolant tub 53. As a result, as the coolant containing the floating matter in the outer peripheral coolant tub 53 is led to the central coolant tub 54 and is fed by the second pump 60 from the central coolant tub 54 to the filtering device 70, whereby the floating matter is removed.

According to the feature of the forgoing embodiment in a second aspect shown in FIGS. 1 and 2, the supply port (first supply port) 45 is oriented to generate the rotational flow of the coolant in the central coolant tub 54. The suction port 61 of the second pump 60 is arranged at the center of the central coolant tub 54. Thus, it is possible to move the floating matter in the central coolant tub 54 to the rotational center by generating the rotational flow in the central coolant tub 54. Since the suction port 61 of the second pump 60 is arranged at the center of the rotational flow, it is possible to reliably draw the floating matter in the coolant in the central coolant tub 54 by the second pump 60 and to feed the floating matter to the filtering device 70.

According to the feature of the forgoing embodiment in a third aspect shown in FIGS. 1 and 2, the guide member 56 is provided on the internal surface of the partition member 52 on the upper stream side than the slit 52*a* in the rotational flow of the coolant in the central coolant tub 54 for guiding the flow of coolant in the central coolant tub 54 radially inward of the central coolant tub 54. Thus, although an anxiety may otherwise arise that the slit 52*a* of the partition member 52 causes the coolant to move from the central coolant tub 54 to the outer peripheral coolant tub 53, it is possible by providing the guide member 56 to restrain the coolant in the central coolant tub 54 from moving to the outer peripheral coolant tub 53 through the slit 52*a*. Particularly, the arrangement of the guide member 56 is made taking the rotational direction of the coolant in the central coolant tub 54 into consideration. Specifically, since the guide member 56 is provided on the upper stream side than the slit 56, the coolant rotating around the internal surface of the partition member 52 is brought into hit on the guide member 56. The coolant brought into hit on the guide member 56 is guided radially inward, that is, to the suction port 61 of the second pump 60. In this way, since the flow direction toward the radially inner side is formed just before the slit 52*a*, it is possible to reliably restrain the coolant in the central coolant tub 54 from moving to the outer peripheral coolant tub 53 through the slit 52*a*.

According to the feature of the forgoing embodiment in a fourth aspect shown in FIGS. 1 and 2, the supply port (second supply port) 82 is oriented to generate the rotational flow of the coolant in the outer peripheral coolant tub 53, and the rotational flow in the central coolant tub 54 and the rotational flow in the outer peripheral coolant tub 53 are the same in rotational direction. Thus, by generating the rotational flow in the outer peripheral coolant tub 53, it is possible to move the floating matter in the coolant in the outer peripheral coolant tub 53 toward the rotational center side, that is, toward the central coolant tub 54 side. Furthermore, since the rotational flow in the central coolant tub 54 and the rotational flow in the outer peripheral coolant tub 53 are made to be the same in rotational direction. Therefore, the floating matter being adjacent to the slit 52a tends to move from the outer peripheral coolant tub 53 side toward the central coolant tub 54 side. Accordingly, it is possible to reliably move the floating matter in the coolant in the outer peripheral coolant tub 53 to the rotational center of the central coolant tub 54, and hence to feed the floating matter to the filtering device 70 by the second pump 60.

According to the feature of the forgoing embodiment in a fifth aspect shown in FIGS. 1 and 2, the flow quantity per unit time of the coolant that is supplied from the machine tool 10 to the central coolant tub 54 without passing through the outer peripheral coolant tub 53 is set to be less than the flow quantity per unit time of the coolant that is drawn from the suction port 61 of the second pump 60. Thus, the operation is performed so that the coolant in the central coolant tub 54 decreases in storage quantity. That is, the dirtiest coolant discharged from the machine tool 10 can reliably be drawn by the second pump 60. The outer peripheral coolant tub 53 and the central coolant tub 54 are in communication through the slit 52a. Therefore, by making the unit flow rate of the coolant drawn by the second pump 60 more than the unit flow rate of the coolant supplied to the central coolant tub 54, it results that the coolant in the outer peripheral coolant tub 53 moves to the central coolant tub 54 through the slit 52a. Accordingly, it is possible to make the coolant in the central coolant tub 54 and the coolant in the outer peripheral coolant tub 53 drawn reliably by the second pump 60.

According to the feature of the forgoing embodiment in a sixth aspect shown in FIGS. 1 and 2, the first coolant return mechanism CR1 is arranged to extend from the machine tool 10 to the central coolant tub 54 for supplying the coolant discharged from the machine tool 10 to the central coolant tub 53, and the first coolant return mechanism CR1 includes the supply port (first supply port) 45 and the primary filtering device 40 that removes machining chips of metal contained in the coolant discharged from the machine tool 10 and that supplies to the central coolant tub 54 the coolant from which the machining chips of metal have been removed. Therefore, the central coolant tub 54 can be supplied with the coolant from which the machining chips of metal have been removed to some degree.

According to the feature of the forgoing embodiment in a seventh aspect shown in FIGS. 1 and 2, the secondary reservoir 80 is supplied with the coolant filtered by the filtering device 70, and the second coolant return mechanism CR2 is arranged to extend from the secondary reservoir 80 to the outer peripheral coolant tub 53. The second coolant return mechanism CR2 includes the supply port (second supply port) 82 for supplying at least the part of the coolant that is to overflow from the secondary reservoir 80, to the outer peripheral coolant tub 53. Therefore, the outer peripheral coolant tub 53 is supplied with the coolant that has been filtered by the filtering device 70 and that is to overflow from the secondary reservoir 80.

According to the feature of the forgoing embodiment in an eighth aspect typically shown in FIG. 3, the reservoir frame 51 is constituted as the unit frame 100 that unites into a single body the secondary reservoir 80 and the reservoir 50 whose interior is partitioned into the outer peripheral coolant tub 53 and the central coolant tub 54. Therefore, the secondary reservoir 80 and the reservoir 50 can be united into a single body so as to become easier and expedient in manufacturing, handling and transporting.

Obviously, numerous modifications and variations of the present invention are possible in light of the above teachings. It is therefore to be understood that within the scope of the appended claims, the present invention may be practiced otherwise than as specifically described herein.

What is claimed is:
1. A coolant system comprising:
a reservoir that stores coolant discharged from a machine tool;
a filtering device that filters the coolant in the reservoir;
a secondary reservoir fluidically connected with the reservoir, to be supplied with the coolant filtered by the filtering device;
a first pump having a suction port in the secondary reservoir, and that feeds the coolant after filtration to the machine tool; and
a second pump that feeds the coolant in the reservoir to the filtering device;
wherein the reservoir comprises:
a reservoir frame; and
a partition member that partitions the interior of the reservoir frame into an outer peripheral coolant tub and a central coolant tub and that is formed with a slit extending in the depth direction to make the outer peripheral coolant tub communicate with the central coolant tub, wherein a coolant return extends from the secondary reservoir to the outer peripheral coolant tub for supplying coolant from the secondary reservoir to the outer peripheral coolant tub;
wherein a suction port of the second pump is arranged in the central coolant tub;
the system further comprising:
a first supply port that supplies the central coolant tub with the coolant fed from the machine tool without passing through the outer peripheral coolant tub; and
a second supply port that supplies the outer peripheral coolant tub with at least a part of the coolant filtered by the filtering device and fed from the filtering device without passing through the central coolant tub.
2. The coolant system in claim 1, wherein:
the first supply port is oriented to generate a rotational flow of the coolant in the central coolant tub; and
the suction port of the second pump is arranged at the center of the central coolant tub.
3. The coolant system in claim 2, further comprising:
a guide member that is provided on an internal surface of the partition member on an upper stream side than the slit in the rotational flow of the coolant in the central coolant tub for guiding the flow of the coolant in the central coolant tub radially inward of the central coolant tub.
4. The coolant system in claim 2, wherein:
the second supply port is oriented to generate a rotational flow of the coolant in the outer peripheral coolant tub; and
the rotational flow in the central coolant tub and the rotational flow in the outer peripheral coolant tub are the same in rotational direction.
5. The coolant system in claim 1, wherein:
the flow quantity per unit time of the coolant that is supplied from the machine tool to the central coolant tub without passing through the outer peripheral coolant tub is set to be less than the flow quantity per unit time of the coolant that is drawn from the suction port of the second pump.

6. The coolant system in claim 1, further comprising:
a first coolant return mechanism arranged to extend from the machine tool to the central coolant tub for supplying the coolant discharged from the machine tool to the central coolant tub; the first coolant return mechanism including:
the first supply port; and
a primary filtering device that removes machining chips of metal contained in the coolant discharged from the machine tool and that supplies to the central coolant tub the coolant from which the machining chips of metal have been removed.

7. The coolant system in claim 6,
wherein a second coolant return mechanism is arranged to supply at least the part of the coolant that is to overflow from the secondary reservoir to the outer peripheral coolant tub.

8. The coolant system in claim 1, wherein:
the reservoir frame is constituted as a unit frame that unites into a single body the secondary reservoir and the reservoir whose interior is partitioned into the outer peripheral coolant tub and the central coolant tub.

* * * * *